(12) United States Patent
Naito et al.

(10) Patent No.: US 10,370,485 B2
(45) Date of Patent: Aug. 6, 2019

(54) METHOD FOR PRODUCING CONDUCTIVE POLYMER AND METHOD FOR PRODUCING SOLID ELECTROLYTE CAPACITOR

(71) Applicant: SHOWA DENKO K.K., Minato-ku, Tokyo (JP)

(72) Inventors: Kazumi Naito, Tokyo (JP); Shoji Yabe, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 0 days.

(21) Appl. No.: 15/795,880

(22) Filed: Oct. 27, 2017

(65) Prior Publication Data

US 2018/0051131 A1  Feb. 22, 2018

Related U.S. Application Data

(62) Division of application No. 14/416,967, filed as application No. PCT/JP2013/004532 on Jul. 25, 2013, now Pat. No. 9,828,460.

(30) Foreign Application Priority Data

Jul. 25, 2012 (JP) .................................. 2012-164415

(51) Int. Cl.
| | |
|---|---|
| *C25B 3/00* | (2006.01) |
| *C08G 61/12* | (2006.01) |
| *C25D 9/02* | (2006.01) |
| *C25D 11/20* | (2006.01) |
| *H01G 9/028* | (2006.01) |
| *H01G 9/00* | (2006.01) |
| *H01G 9/15* | (2006.01) |

(52) U.S. Cl.
CPC ......... *C08G 61/126* (2013.01); *C08G 61/124* (2013.01); *C25B 3/00* (2013.01); *C25D 9/02* (2013.01); *C25D 11/20* (2013.01); *H01G 9/0036* (2013.01); *H01G 9/028* (2013.01); *C08G 2261/11* (2013.01); *C08G 2261/18* (2013.01); *C08G 2261/3221* (2013.01); *C08G 2261/3223* (2013.01); *C08G 2261/3247* (2013.01); *C08G 2261/44* (2013.01); *C08G 2261/51* (2013.01); *C08G 2261/90* (2013.01); *H01G 9/15* (2013.01)

(58) Field of Classification Search
CPC ........................................................ C25B 3/00
USPC ........................................................ 205/414
See application file for complete search history.

(56) References Cited

U.S. PATENT DOCUMENTS

| | | | | | |
|---|---|---|---|---|---|
| 5,133,841 | A | * | 7/1992 | Higo ................... | C08G 73/1067 205/419 |
| 6,328,874 | B1 | * | 12/2001 | Kinlen ................... | C25D 11/04 205/317 |
| 7,842,103 | B2 | | 11/2010 | Naito et al. | |
| 2004/0102577 | A1 | * | 5/2004 | Hsu ........................ | B82Y 10/00 525/182 |
| 2011/0017982 | A1 | | 1/2011 | Naito et al. | |
| 2013/0242466 | A1 | | 9/2013 | Masheder et al. | |

FOREIGN PATENT DOCUMENTS

| | | | | | |
|---|---|---|---|---|---|
| CN | 101979438 | A | * | 2/2011 | .............. C08L 79/04 |
| CN | 102020832 | A | * | 4/2011 | .............. C08L 65/00 |
| JP | 60-37114 | A | | 2/1985 | |
| JP | 5-175081 | A | | 7/1993 | |
| JP | 2000-353641 | A | | 12/2000 | |
| WO | 2011/108255 | A1 | | 9/2011 | |
| WO | WO-2011108255 | A1 | * | 9/2011 | ............... H01G 9/02 |

OTHER PUBLICATIONS

International Search Report of PCT/JP2013/004532, dated Oct. 29, 2013. [PCT/ISA/210].
Machine translation of WO 2011/108255 as per JP 5828588, published Sep. 9, 2011.

* cited by examiner

*Primary Examiner* — Edna Wong
(74) *Attorney, Agent, or Firm* — Sughrue Mion, PLLC

(57) ABSTRACT

A solid electrolytic capacitor is obtained by a method which includes dissolving a polymerizable material for being converted into a conductive polymer in a water-soluble organic solvent to obtain a solution, adding the solution to water while homogenizing the solution to obtain a sol, immersing an anode body having a dielectric layer in the surface of the anode body in the sol, and applying voltage using the anode body as a positive electrode and a counter electrode as a negative electrode placed in the sol to electropolymerize the polymerizable material. An electropolymerizable liquid for producing a conductive polymer, the liquid composed of a sol comprising water, a water-soluble organic solvent, and a polymerizable material for being converted into the conductive polymer.

18 Claims, No Drawings

METHOD FOR PRODUCING CONDUCTIVE POLYMER AND METHOD FOR PRODUCING SOLID ELECTROLYTE CAPACITOR

CROSS-REFERENCE TO RELATED APPLICATIONS

This application is a divisional of U.S. patent application Ser. No. 14/416,967 filed on Jan. 23, 2015, now U.S. Pat. No. 9,828,460, which is a National Stage of International Application No. PCT/JP2013/004532 filed Jul. 25, 2013, claiming priority based on Japanese Patent Application No. 2012-164415, filed Jul. 25, 2012, the contents of all of which are incorporated herein by reference in their entirety.

TECHNICAL FIELD

The present invention relates to a method for producing a conductive polymer. More specifically, the present invention relates to a method for producing a conductive polymer for obtaining a solid electrolytic capacitor with low ESL (equivalent series inductance).

BACKGROUND ART

A semiconductor layer comprising a conductive polymer is generally used as the cathode of a solid electrolytic capacitor. For example, a known method for forming a semiconductor layer comprises immersing an anode body having a dielectric layer on the surface thereof in an electrolyte solution in which a monomer for forming a conductive polymer and a dopant are dissolved in water, and electropolymerizing the monomer. This method results in the formation of a semiconductor layer comprising a conductive polymer on the dielectric layer. In this method, for example, a compound having a thiophene skeleton is used as the monomer. Such a monomer is only slightly soluble in water. The amount of monomer dissolved in the electrolyte solution is not sufficient for the formation of a semiconductor layer.

The monomer is easily dissolved in an organic solvent. It is proposed to use an organic solvent, rather than water, as a solvent of an electrolyte solution for an electropolymerization (Patent Document 1). However, many organic solvents are easily evaporated, and it requires time and labor to maintain the liquid surface position. Moreover, an electrolyte solution using such a non-aqueous organic solvent has high electrical resistance, which causes a problem of low polymerization efficiency.

It is proposed to use a mixed solvent of water and an organic solvent as a solvent of an electrolyte solution. The solubility of the monomer in this mixed solvent is higher than that of a solvent using only water; however, the monomer cannot be dissolved in an amount required to form a semiconductor layer.

In order to increase the amount of monomer supplied, Patent Document 2 discloses a technique for adding a monomer in an amount exceeding the saturated solubility to a mixed solvent of water and an organic solvent, suspending a part of the monomer in the solvent, and performing electropolymerization while stirring the suspension.

CITATION LIST

Patent Literatures

Patent Document 1: JP S60-037114 A
Patent Document 2: WO 2007/004556 A

SUMMARY OF THE INVENTION

Problem to be Resolved by the Invention

When electropolymerization is performed in a monomer suspension, the monomer droplets may block the entrance of pores in the anode body. Since the dopant is not sufficiently taken deep into the blocked pores, the conductive polymer formed in this pore portion may have lower electrical conductivity by several digits than that of conductive polymers formed in other portions. The formation of a semiconductor layer with inhomogeneous electrical conductivity results in an increase in ESL (equivalent series inductance).

An object of the present invention is to provide a method for producing a solid electrolytic capacitor with low ESL (equivalent series inductance).

Means for Solving the Problem

As a result of extensive research to achieve the above object, the present inventors have completed the invention including the following embodiments.

[1] A method for producing a conductive polymer, wherein the method comprises electropolymerizing a polymerizable material in a sol comprising the polymerizable material, in which the polymerizable material is to be converted into the conductive polymer.

[2] The method for producing a conductive polymer according to [1], wherein the polymerizable material is at least one selected from the group consisting of compounds having a thiophene skeleton and compounds having a pyrrole skeleton.

[3] The method for producing a conductive polymer according to [1] or [2], wherein a content of the polymerizable material is from 2 g/L to 7 g/L in the sol.

[4] The method for producing a conductive polymer according to any one of [1] to [3], wherein the sol is obtained by dissolving the polymerizable material, which is to be converted into a conductive polymer, in a water-soluble organic solvent to obtain a solution, and adding the solution to water while homogenizing the solution.

[5] The method for producing a conductive polymer according to any one of [1] to [4], wherein a dispersoid in the sol has a 50% diameter of 0.5 nm to 1,000 nm in volumetric basis particle size cumulative distribution.

[6] The method for producing a conductive polymer according to any one of [1] to [5], wherein the sol further comprises a dopant.

[7] A method for producing a solid electrolytic capacitor, wherein the method comprises performing the production method according to any one of [1] to [6] in the presence of an anode body, which has a dielectric layer in the surface of the anode body, to form a conductive polymer layer on the dielectric layer in the surface of the anode body.

[8] The method for producing a solid electrolytic capacitor according to [7], wherein the electropolymerization is performed using the anode body as a positive electrode and a counter electrode as a negative electrode which are placed in the sol.

[9] The method for producing a solid electrolytic capacitor according to [7] or [8], wherein the method further comprises immersing the anode body, which has a dielectric layer on the surface of the anode body, in a water-soluble organic solvent solution comprising the polymerizable material, in which the polymerizable material is to be converted into a conductive polymer, pulling the anode body out of the solution, and then immersing the anode body in a sol comprising the polymerizable material.

[10] An electropolymerizable liquid for producing a conductive polymer, wherein the electropolymerizable liquid is composed of a sol comprising a polymerizable material, water, and a water-soluble organic solvent, wherein the polymerizable material is to be converted into the conductive polymer.

[11] The electropolymerizable liquid for producing a conductive polymer according to [10], wherein the sol further comprises a dopant.

Advantageous Effects of the Invention

Forming of a semiconductor layer by the production method of the present invention results in producing a solid electrolytic capacitor with low ESL (equivalent series inductance).

EMBODIMENTS FOR CARRYING OUT THE INVENTION

The method for producing a conductive polymer according to the present invention in which the method comprises electropolymerizing a polymerizable material, which is to be converted into a conductive polymer, in a sol comprising the polymerizable material. The sol comprises a liquid dispersion medium and a fine dispersoid dispersed in the dispersion medium.

The dispersoid constituting the sol used in the present invention preferably has a 50% diameter (D50) of preferably 0.5 nm to 1,000 nm, and more preferably 1 nm to 400 nm in volumetric basis particle size cumulative distribution. When the 50% diameter of the dispersoid is smaller than visible light wavelength, the sol looks homogeneous and transparent when observed with the naked eye. The 50% diameter (D50) in volumetric basis particle size cumulative distribution is measured by a dynamic light scattering method.

A preferred sol used in the present invention is formed with a dispersoid comprising a polymerizable material to be converted into a conductive polymer, and a dispersion medium comprising a liquid phase in which a small amount of polymerizable material to be converted into a conductive polymer is dissolved.

The sol used in the present invention is not particularly limited by the preparation method thereof. For instance, the sol can be obtained by dissolving a polymerizable material to be converted into a conductive polymer in a water-soluble organic solvent to obtain a solution, mixing the solution with water, and finely dispersing (homogenizing) the mixture.

The polymerizable material for being converted into a conductive polymer used in the present invention is not particularly limited. Examples thereof include compounds having a thiophene skeleton and compounds having a pyrrole skeleton. These polymerizable materials are available as commercial products, and can be produced by a known method.

Examples of compounds having a thiophene skeleton include 3-methylthiophene, 3-ethylthiophene, 3-n-propylthiophene, 3-n-butylthiophene, 3-n-pentylthiophene, 3-n-hexylthiophene, 3-n-heptylthiophene, 3-n-octylthiophene, 3-n-nonylthiophene, 3-n-decylthiophene, 3-n-undecylthiophene, 3-n-dodecylthiophene, 3-n-octadodecylthiophene, 3-methoxythiophene, 3-phenylthiophene, 3-thiophenecarboxylic acid, 3-thiophenealdehyde, thiophene-3-acetic acid, 3-thiopheneethanol, 3-thiophenemalonic acid, 3-thiophenemethanol, 3-fluorothiophene, 3-bromothiophene, 3-iodothiophene, 3-cyanothiophene, 3-bromo-4-methylthiophene, 3,4-dimethylthiophene, 3,4-diethylthiophene, 3,4-butylenethiophene, 3,4-methylenedioxythiophene, 3,4-ethylenedioxythiophene, and the like.

Examples of compounds having a pyrrole skeleton include pyrrole, 3-methylpyrrole, 3-ethylpyrrole, 3-propylpyrrole, 3-butylpyrrole, 3-pentylpyrrole, 3-hexylpyrrole, 3-heptylpyrrole, 3-octylpyrrole, 3-nonylpyrrole, 3-decylpyrrole, 3-fluoropyrrole, 3-chloropyrrole, 3-bromopyrrole, 3-cyanopyrrole, 3,4-dimethylpyrrole, 3,4-diethylpyrrole, 3,4-butylenepyrrole, 3,4-methylenedioxypyrrole, 3,4-ethylenedioxypyrrole, and the like.

The amount of polymerizable material contained in the sol is preferably from 2 to 7 g/L, and more preferably from 4 to 6 g/L.

Water-soluble organic solvents are highly compatible with water. More specifically, such solvents are dissolved in an amount of preferably 10 ml or more, more preferably 50 ml or more and even more preferably 100 ml or more in 100 ml of water. Examples of water-soluble organic solvents include polyhydric alcohols, such as ethylene glycol, propylene glycol, trimethylene glycol, diethylene glycol, dipropylene glycol, triethylene glycol, tripropylene glycol, tetraethylene glycol, glycerin, trimethylolethane, trimethylolpropane and the like; polyalcohol derivatives, such as ethylene glycol diglycidyl ether, ethylene glycol dimethyl ether, ethylene glycol monoacetate, ethylene glycol monomethyl ether, ethylene glycol monoethyl ether, ethylene glycol monobutyl ether, ethylene glycol monomethoxymethyl ether, diethylene glycol dimethyl ether, diethylene glycol ethyl methyl ether, diethylene glycol diethyl ether, diethylene glycol diacetate, diethylene glycol dibenzoate, diethylene glycol monomethyl ether, diethylene glycol monoethyl ether, diethylene glycol monomethyl acetate, triethylene glycol monomethyl ether, triethylene glycol monoethyl ether, triethylene glycol dimethyl ether, propylene glycol methyl ether, propylene glycol monoethyl ether, dipropylene glycol monomethyl ether, dipropylene glycol monoethyl ether, glycerrin glycidyl ether, glycerin monoacetate, glycerin diacetate, glycerin triacetate and the like.

Preferred among these water-soluble organic solvents are those having a boiling point of preferably 150° C. or more, and more preferably 170° C. or more. Moreover, the upper limit of the boiling point of the water-soluble organic solvent is preferably 400° C., more preferably 350° C., and even more preferably 300° C. Among the above water-soluble organic solvents, polyhydric alcohols are preferred because they are well dissolved in large amounts in water. Among polyhydric alcohols, ethylene glycol and propylene glycol are particularly preferred.

The technique for dissolving a polymerizable material to be converted into a conductive polymer in a water-soluble organic solvent is not particularly limited. For example, the polymerizable material is added to the water-soluble organic solvent at room temperature, and the mixture is stirred, thereby obtaining a solution. The amount of the polymerizable material is preferably from 1 to 2 parts by mass, and more preferably from 1.2 to 1.8 parts by mass, based on 100 parts by mass of the water-soluble organic solvent.

Next, the solution is mixed with water. The mixing may be performed by adding water to the solution, adding the solution to water, or simultaneously pouring the solution and water with a predetermined ratio. In order to improve the stability of the sol, homogenization may be performed. The technique of homogenization is not particularly limited.

Examples thereof include stirring with a homogenizer, etc., ultrasonic irradiation, and the like. The most preferred technique is to add the solution to water while homogenizing the solution. The mass ratio of solution/water is preferably from 2/8 to 6/4, and more preferably from 3/7 to 5/5.

It is preferable that the sol used in the present invention further comprises a dopant. The dopant can be added to water to be mixed with the above solution, or to a sol obtained by mixing the solution and water. The dopant is not particularly limited as long as it can increase the electrical conductivity of the conductive polymer. Examples of dopants include halide ions, such as hexafluorophosphorus, hexafluoroarsenic, hexafluoroantimony, and tetrafluoroboron; alkyl-substituted organic sulfonic acid ions, such as methanesulfonic acid and dodecylsulfonic acid; cyclic sulfonic acid ions, such as camphor sulfonic acid ion; alkyl-substituted or unsubstituted benzenemonosulfonic or benzenedisulfonic acid ions, such as benzenesulfonic acid, para-toluenesulfonic acid, dodecylbenzenesulfonic acid, and benzenedisulfonic acid; alkyl-substituted or unsubstituted ions of naphthalenesulfonic acid substituted with 1 to 4 sulfonic acid groups, such as 2-naphthalenesulfonic acid and 1,7-naphthalenedisulfonic acid; alkyl-substituted or unsubstituted biphenylsulfonic acid ions, such as anthracenesulfonic acid ion, anthraquinonesulfonic acid ion, benzoquinonesulfonic acid ion, alkylbiphenylsulfonic acid, and biphenyldisulfonic acid; substituted or unsubstituted aromatic sulfonic acid ions, such as polymeric sulfonic acid ions, e.g., polystyrenesulfonic acid and naphthalenesulfonic acid-formalin condensate; boron compound ions, such as boron bis-salicylate and boron bis-catecholate; heteropolyacid ions, such as molybdophosphoric acid, tungstophosphoric acid, tungstomolybdophosphoric acid; or salts thereof. The dopant can be contained in the sol by adding a compound that can release the dopant to the sol. The amount of dopant added is not particularly limited. For example, the amount of dopant as the mass of a compound that can release the dopant is preferably 150 to 250 parts by mass, and more preferably 200 to 220 parts by mass, based on 100 parts by mass of the polymerizable material.

The sol comprising a polymerizable material to be converted into a conductive polymer, water, and a water-soluble organic solvent, and preferably a dopant is useful as an electropolymerizable liquid for producing a conductive polymer. Since the size of the dispersoid of the sol is small, it is considered that the entrance of pores in the sintered body is hardly blocked, unlike a monomer suspension.

Electropolymerization is performed by immersing a conductive base material, which serves as a positive electrode, in the sol, and applying voltage between the positive electrode and a negative electrode placed in the same sol. The voltage to be applied is not particularly limited, and can be suitably set depending on the purpose. As a result of applying voltage, the polymerizable material is electropolymerized, thereby synthesizing the target conductive polymer.

The method for producing a solid electrolytic capacitor according to the present invention comprises performing the above method for producing a conductive polymer in the presence of an anode body having a dielectric layer in the surface of the abode body, thereby forming a conductive polymer layer on the dielectric layer in the surface of the anode body. Specifically, the anode body having a dielectric layer in the surface thereof is immersed in a sol containing a polymerizable material to be converted into a conductive polymer, and the polymerizable material is electropolymerized in the sol. It is preferable that before the anode body having a dielectric layer in the surface thereof is immersed in the sol, the anode body having a dielectric layer in the surface thereof is immersed in a water-soluble organic solvent solution of the polymerizable material to be converted into a conductive polymer, and pulled out of the solution. This operation allows the polymerizable material to permeate the anode body having a dielectric layer in the surface thereof, and contributes to the formation of a more homogeneous conductive polymer.

The anode body having a dielectric layer in the surface thereof may be a commercial product, or may be obtained by electrolytically oxidizing an anode body to chemically convert the surface layer of the anode body into a dielectric. Generally, an anode body is produced from a valve action metal. A porous anode body obtained by sintering valve action metal powder is preferably used in order to increase the superficial measure of the dielectric layer. Examples of valve action metals include aluminum, tantalum, niobium, tungsten, and the like. An anode lead wire can be implanted by burying it in the anode body to serve as the terminal of the anode body.

Electrolytic oxidation of the surface layer of the anode body can be performed according to a known method. Specifically, electrolytic oxidation is performed by immersing the anode body in an electrolyte solution in which an electrolyte, such as nitric acid, sulfuric acid, phosphoric acid, oxalic acid, or adipic acid, and optionally an oxygen modular, such as hydrogen peroxide or ozone, are dissolved, and applying voltage thereto. Voltage is applied between the anode body (positive electrode) and a counter electrode (negative electrode). Electricity can be applied to the anode body through the anode lead wire implanted in the anode body.

A cathode comprising a conductive polymer is formed on the anode body subjected to chemical conversion in the above manner. The cathode is formed by the method for producing a conductive polymer according to the present invention. Electropolymerization is performed by immersing the anode body, which serves as a positive electrode, in the sol, and applying voltage between the positive electrode and a negative electrode placed in the same sol. Thereby, a semiconductor layer comprising a conductive polymer is formed on the dielectric layer in the surface of the anode body. Further, a conductor layer, i.e., a conductive paste layer, such as a carbon paste layer, silver paste layer, or metal plating layer, may be formed on the semiconductor layer.

A cathode lead is electrically connected to the above cathode, and a part of the cathode lead is exposed to the outside of the exterior of the electrolytic capacitor to serve as a cathode external terminal. On the other hand, an anode lead is electrically connected to the anode body via the anode lead wire, and a part of the anode lead is exposed to the outside of the exterior of the electrolytic capacitor to serve as an anode external terminal. A normal lead frame can be used to attach the cathode lead and the anode lead. Then, the exterior is formed by sealing with resin, etc., thereby obtaining a solid electrolytic capacitor. The thus-produced solid electrolytic capacitor may be subjected to aging treatment, as required. The solid electrolytic capacitor obtained by the production method of the present invention can be used by mounting it in various electric circuits or electronic circuits.

EXAMPLES

The present invention is explained in more detail below with reference to Examples. Note that they are merely examples for explanation, and the present invention is not limited thereto.

The characteristics, etc., were measured as follows.
(Capacitance)

Conductor wires connected to an LCR meter (produced by Agilent Technologies) were brought into contact with the conductor layer of a capacitor element and a lead wire implanted in the capacitor element. The capacitance at 120 Hz was measured by the LCR meter.

(Leakage Current)

Voltage of 2.5 V was applied to a capacitor element at room temperature. When 30 seconds passed from the start of voltage application, the electric current value (leakage current) of a circuit of the plus terminal of a power supply across the lead wire of the capacitor element, the conductor layer of the capacitor element, and the minus terminal of the power supply was measured.

(ESL)

Conductor wires connected to an LCR meter (produced by Agilent Technologies) were brought into contact with the conductor layer of a capacitor element and a lead wire implanted in the capacitor element. ESL at 500 kHz was measured by the LCR meter.

Example 1

[Preparation of Electropolymerizable Liquid]

In 250 parts by mass of ethylene glycol, 3.7 parts by mass of 3,4-Ethylenedioxythiophene was dissolved to prepare a solution. The solution was added to 525 parts by mass of water while homogenizing the solution with a homogenizer (NS-51, produced by Microtec Co., Ltd.). Then, 7.5 parts by mass of anthraquinonesulfonic acid dopant was added while homogenizing. The thus-obtained sol was homogeneous and transparent. The sol was placed in a stainless steel container as an electropolymerizable liquid.

Tantalum powder having 250,000 CV/g was compressed together with tantalum wires (lead wires) having a diameter of 0.29 mm. The compacts were vacuum-fired at 1,290° C. for 30 minutes, thereby obtaining a plurality of sintered bodies having a size of 1.0 mm×1.5 mm×4.5 mm. Each of the lead wires having a diameter of 0.29 was implanted in the center of the 1.0 mm×1.5 mm surface of each of the obtained sintered bodies so that 8 mm of the lead wire projected from the sintered body and 3.2 mm of the lead wire was buried in the sintered body. A tetrafluoroethylene washer having an inner diameter of 0.26 mm, an outer diameter of 0.80 mm, and a thickness of 0.20 mm was attached to the lead wire in a position 0.20 mm apart from the sintered body.

[Chemical Conversion Treatment]

The sintered body was immersed in a 2% by mass phosphoric acid aqueous solution so that the entire sintered body sank in the solution and the upper surface of the washer was in contact with the solution. And electrolytic oxidation was performed at 80° C. at 8V for 300 minutes, thereby chemically converting the surface layer of the sintered body into a dielectric.

The sintered body formed with a dielectric layer was immersed in a 10% by mass iron (III) toluenesulfonate aqueous solution. The sintered body was pulled out of the aqueous solution, and dried at room temperature. The immersion-drying operation was further repeated 4 times (5 times in total).

Then, the sintered body was immersed in a 20% by mass 3,4-ethylenedioxythiophene monomer ethanol solution. The sintered body was pulled out of the ethanol solution, and dried at room temperature.

[Electropolymerization]

Subsequently, the sintered body was immersed in the electropolymerizable liquid so that the entire sintered body sank in the liquid and the lower surface of the washer was in contact with the liquid. Using the lead wire as a positive and the stainless steel container as a negative, electropolymerization was performed by applying electric current at room temperature first at 40 µA for 15 minutes, then at 80 µA for 45 minutes, and finally at 120 µA for 10 minutes. The sintered body was pulled out of the electropolymerizable liquid, washed, and dried (1st treatment). This immersion-electropolymerization-washing-drying operation was performed once again (2nd treatment).

The immersion-electropolymerization-washing-drying operation was performed twice in the same manner as above, except that the electric current pattern was changed to 80 µA for 30 minutes, and then 120 µA for 30 minutes (3rd and 4th treatments).

The immersion-electropolymerization-washing-drying operation was performed twice in the same manner as above, except that the electric current pattern was changed to 120 µA for 30 minutes, and then 140 µA for 40 minutes (5th and 6th treatments).

The immersion-electropolymerization-washing-drying operation was performed once in the same manner as above, except that the electric current pattern was changed to 80 µA for 15 minutes, then 60 µA for 50 minutes, and finally 40 µA for 30 minutes (7th treatment).

Thus, a conductive polymer was formed on the dielectric layer on the surface of the sintered body.

[Additional Chemical Conversion Treatment]

Thereafter, the sintered body with a conductive polymer formed on the dielectric layer was immersed in a 2% by mass phosphoric acid aqueous solution, and electrolytic oxidation was performed at 80° C. at 5 V for 20 minutes.

Subsequently, a carbon paste layer and a silver paste layer were sequentially laminated, thereby producing a capacitor element.

The two capacitor elements were placed in parallel in the same direction so that the 1.5 mm×4.5 mm surface of each element was in contact with a cathode part of a lead frame having a thickness of 100 µm made of a copper alloy having the under plating layer of 0.6-µm-thick nickel and the outermost plating layer of 5-µm-thick tin, and they were connected with silver paste. The lead wire cut into a predetermined size was connected by welding to an anode part of the lead frame. The capacitor elements were sealed with a resin, while leaving a part of the lead frame unsealed. The lead frame protruding from the side of the resin-sealed body was cut at a predetermined position, and folded twice along the resin-sealed body. Thus, 320 chip-like solid electrolytic capacitors were obtained in which each capacitor has a size of 7.3 mm×4.3 mm×1.8 mm and a rating of 2.5 V and has a cut end of the lead frame on the undersurface of the resin-sealed body. The yield of capacitors with an LC of 0.1 CVµA or less was 90% or more. Table 1 shows the performance of the obtained capacitors. The numerical values in Table 1 are the average value of capacitors with a leakage current (LC) of 0.1 CVµA or less among the produced 320 capacitors. The capacitance was measured at 120 Hz, and ESL was measured at 500 kHz. The measurements were performed using an LCR meter produced by Agilent Technologies.

Comparative Example 1

To obtain a mixed solvent, 250 parts by mass of ethylene glycol, 525 parts by mass of water, and 7.5 parts by mass of anthraquinonesulfonic acid dopant were mixed together. To the mixed solvent, 3.7 parts by mass of 3,4-ethylenedioxythiophene was added, and homogenized with a homogenizer (NS-51, produced by Microtec Co., Ltd.). The 3,4-ethylenedioxythiophene was not completely dissolved, and a solution with two separate phases was obtained. Solid electrolytic capacitors were obtained in the same manner as in Example 1, except that the solution was used as the electropolymerizable liquid. The yield of capacitors with an LC of 0.1 CVμA or less was 90% or more. Table 1 shows the performance of the obtained capacitors.

Example 2

Solid electrolytic capacitors were obtained in the same manner as in Example 1, except that 250 parts by mass of ethylene glycol was changed to 388.5 parts by mass of propylene glycol, the amount of 3,4-ethylenedioxythiophene was changed to 4.5 parts by mass, the amount of water was changed to 375 parts by mass, and the amount of anthraquinonesulfonic acid dopant was changed to 9.2 parts by mass. The electropolymerizable liquid was a homogeneous and transparent sol. The yield of capacitors with an LC of 0.1 CVμA or less was 90% or more. Table 1 shows the performance of the obtained capacitors.

Comparative Example 2

Solid electrolytic capacitors were obtained in the same manner as in Comparative Example 1, except that 250 parts by mass of ethylene glycol was changed to 388.5 parts by mass of propylene glycol, the amount of 3,4-ethylenedioxythiophene was changed to 4.5 parts by mass, the amount of water was changed to 375 parts by mass, and the amount of anthraquinonesulfonic acid dopant was changed to 9.2 parts by mass. The electropolymerizable liquid was a solution with two separate phases. The yield of capacitors with an LC of 0.1 CVμA or less was 90% or more. Table 1 shows the performance of the obtained capacitors.

Example 3

Solid electrolytic capacitors were obtained in the same manner as in Example 1, except that 3.7 parts by mass of 3,4-ethylenedioxythiophene was changed to 3.3 parts by mass of pyrrole, and the amount of anthraquinonesulfonic acid dopant was changed to 7.0 parts by mass. The electropolymerizable liquid was a homogeneous and transparent sol. The yield of capacitors with an LC of 0.1 CVμA or less was 90% or more. Table 1 shows the performance of the obtained capacitors.

Comparative Example 3

Solid electrolytic capacitors were obtained in the same manner as in Comparative Example 1, except that 3.7 parts by mass of 3,4-ethylenedioxythiophene was changed to 3.3 parts by mass of pyrrole, and the amount of anthraquinonesulfonic acid dopant was changed to 7.0 parts by mass. The electropolymerizable liquid was a solution with two separate phases. The yield of capacitors with an LC of 0.1 CVμA or less was 90% or more. Table 1 shows the performance of the obtained capacitors.

The results of the Comparative Examples suggest that the amounts of the above polymerizable materials are in excess of their solubility in the solvents, and are basically undissolved amounts. However, all of the electropolymerizable liquids obtained in the Examples are homogeneous and transparent. Accordingly, it was determined that the electropolymerizable liquids obtained in the Examples were "sols," rather than "solutions."

TABLE 1

|  | Capacitance [μF] | ESL [nH] |
| --- | --- | --- |
| Ex.1 | 2100 | 1.8 |
| Comp.Ex.1 | 2120 | 3.9 |
| Ex.2 | 2230 | 2.2 |
| Comp.Ex.2 | 2210 | 3.7 |
| Ex.3 | 1990 | 2.7 |
| Comp.Ex.3 | 1980 | 4.8 |

As shown in Table 1, the solid electrolytic capacitors obtained by the production method of the present invention (Examples) have significantly lower ESL (equivalent series inductance) than the solid electrolytic capacitors obtained by a conventional method (Comparative Examples).

The invention claimed is:

1. A method for producing a conductive polymer, wherein the method comprises:
dissolving a polymerizable material which is converted into the conductive polymer in a water-soluble organic solvent to obtain a solution,
mixing the solution and water to obtain a sol, and
electropolymerizing the polymerizable material in the sol.

2. The method according to claim 1, wherein the polymerizable material is at least one selected from the group consisting of compounds having a thiophene skeleton and compounds having a pyrrole skeleton.

3. The method according to claim 1, wherein a content of the polymerizable material is from 2 g/L to 7 g/L in the sol.

4. The method according to claim 1, wherein the mixing is conducted by adding the solution to the water.

5. The method according to claim 1, wherein a dispersoid in the sol has a 50% diameter of 0.5 nm to 1,000 nm in volumetric basis particle size cumulative distribution.

6. The method according to claim 1, wherein the sol further comprises a dopant.

7. The method according to claim 1, wherein the water-soluble organic solvent is polyhydric alcohols or polyalcohol derivatives.

8. The method according to claim 1, wherein the water-soluble organic solvent has a boiling point of not less than 150°.

9. The method according to claim 1, wherein a mass ratio of the solution to the water is 2/8 to 6/4.

10. The method according to claim 1, wherein an amount of the polymerizable material is 1 to 2 parts by mass relative to 100 parts by mass of the water-soluble organic solvent.

11. An electropolymerizable liquid for producing a conductive polymer, wherein the liquid is composed of a sol comprising a polymerizable material, water, and a water-soluble organic solvent, wherein the polymerizable material is converted into a conductive polymer.

12. The electropolymerizable liquid according to claim 11, wherein the sol further comprises a dopant.

13. The electropolymerizable liquid according to claim 11, wherein a dispersoid in the sol has a 50% diameter of 0.5 nm to 1,000 nm in volumetric basis particle size cumulative distribution.

14. The electropolymerizable liquid according to claim 11, wherein the polymerizable material is at least one selected from the group consisting of compounds having a thiophene skeleton and compounds having a pyrrole skeleton.

15. The electropolymerizable liquid according to claim 11, wherein a content of the polymerizable material is from 2 g/L to 7 g/L in the sol.

16. The electropolymerizable liquid according to claim 11, wherein the sol is formed with a dispersoid comprising the polymerizable material converted into the conductive polymer, and a dispersion medium comprising a liquid phase in which a small amount of the polymerizable material converted into the conductive polymer is dissolved.

17. The electropolymerizable liquid according to claim 11, wherein the sol is homogeneous and transparent.

18. The electropolymerizable liquid according to claim 11, wherein an amount of the polymerizable material is 1 to 2 parts by mass relative to 100 parts by mass of the water-soluble organic solvent.

* * * * *